United States Patent
Uehara et al.

(10) Patent No.: US 7,545,642 B2
(45) Date of Patent: Jun. 9, 2009

(54) AUTOMOTIVE DYNAMOELECTRIC MACHINE

(75) Inventors: Nobuaki Uehara, Tokyo (JP); Tetsuro Ogushi, Tokyo (JP); Yoshihito Asao, Tokyo (JP); Hitoshi Isoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 485 days.

(21) Appl. No.: 11/505,393

(22) Filed: Aug. 17, 2006

(65) Prior Publication Data
US 2007/0046112 A1 Mar. 1, 2007

(30) Foreign Application Priority Data
Aug. 30, 2005 (JP) .............. 2005-249548

(51) Int. Cl.
H05K 7/20 (2006.01)
(52) U.S. Cl. .......................... 361/697; 310/58; 310/64; 310/71
(58) Field of Classification Search ............ 310/58, 310/64, 71; 257/E23.099
See application file for complete search history.

(56) References Cited

U.S. PATENT DOCUMENTS

| | | | | |
|---|---|---|---|---|
| 5,682,070 A | * | 10/1997 | Adachi et al. | 310/71 |
| 5,823,249 A | * | 10/1998 | Batchelder | 165/121 |
| 6,184,600 B1 | * | 2/2001 | Asao et al. | 310/64 |
| 7,015,607 B1 | * | 3/2006 | Ikuta et al. | 310/64 |
| 7,262,967 B2 | * | 8/2007 | Crocker et al. | 361/699 |
| 7,400,070 B2 | * | 7/2008 | Asao et al. | 310/58 |
| 7,414,339 B2 | * | 8/2008 | Kitamura et al. | 310/68 D |
| 2004/0094290 A1 | * | 5/2004 | Lopatinsky et al. | 165/122 |
| 2005/0145366 A1 | * | 7/2005 | Erel | 165/80.3 |

FOREIGN PATENT DOCUMENTS

| JP | 57-157153 U | 10/1982 |
|---|---|---|
| JP | 58-007349 U | 1/1983 |
| JP | 01-104786 U | 7/1989 |
| JP | 10-125836 A | 5/1998 |
| JP | 2001-45726 A | 2/2001 |
| JP | 2003-225000 A | 8/2003 |
| JP | 3527516 B2 | 2/2004 |
| JP | 2004-282905 A | 10/2004 |

* cited by examiner

*Primary Examiner*—Jayprakash N Gandhi
*Assistant Examiner*—Courtney Smith
(74) *Attorney, Agent, or Firm*—Sughrue Mion, PLLC

(57) ABSTRACT

A large number of ventilating apertures that have a circular cross section are disposed through the heatsink so as to extend from an air intake apertured surface to an air discharge apertured surface so as to have aperture directions that are parallel to each other and parallel to an element mount surface, and the heatsink is disposed such that the air intake apertured surface faces an air intake aperture and the aperture directions of the ventilating apertures are aligned in a direction of flow of a cooling airflow.

8 Claims, 7 Drawing Sheets

AUTOMOTIVE DYNAMOELECTRIC MACHINE

BACKGROUND OF THE INVENTION

1. Field of the Invention

The present invention relates to an automotive dynamoelectric machine that is mounted to a vehicle engine, and particularly relates to a construction of a heatsink that is mounted to a heat-generating element and that effectively radiates heat that is generated by the heat-generating element.

2. Description of the Related Art

Conventional automotive dynamoelectric machines include: a case that is constituted by a front bracket and a rear bracket that are made of aluminum; a shaft that is rotatably disposed in the case by means of bearings; a rotor that is fixed to the shaft and accommodated inside the case; fans that are fixed to two end surfaces of the rotor; a stator that is fixed to an inner wall surface of the case so as to surround the rotor; slip rings that are fixed to a rear end of the shaft and that supply electric current to the rotor; a pair of brushes that are disposed inside the case so as to that slide on the slip rings; a brush holder that houses the brushes; a rectifier that is electrically connected to the stator and that rectifies alternating current that is generated in the stator into direct current; a heatsink that is mounted to the brush holder; and a regulator that is fixed adhesively to the heatsink and that adjusts magnitude of an alternating voltage that is generated in the stator (see Patent Literature 1, for example).

Now, the rectifier and the regulator constantly generate heat while the dynamoelectric machines is generating electricity. For this reason, the heatsink is formed such that a plurality of thin plate-shaped fins are arrayed so as to project from a rear surface of a base surface, and the rectifier and the regulator are mounted to that base surface.

The rotor is driven to rotate when the dynamoelectric machine is operating. The fans are rotated together with the rotation of the rotor, generating a cooling airflow. The cooling airflow that is generated by the fans is passed through the heatsink. The cooling airflow passes through between the fins, and heat is exchanged between the fins and the cooling airflow, removing heat that is generated by the rectifier and the regulator. Thus, temperatures of the rectifier and the regulator are kept constant, and the dynamoelectric machine operates normally.

[Patent Literature 1]: Japanese Patent No. 3527516 (Gazette)

In conventional automotive dynamoelectric machines, the rectifier and the regulator are cooled using a heatsink. Improving heat radiating characteristics per unit area of the heatsink leads to stabilization of the operation of the dynamoelectric machine, and also contributes to reductions in the size of the heatsink, and thus to reductions in the size of the dynamoelectric machine.

However, because the heatsink is formed by arraying a large number of thin plate-shaped fins on the rear surface of the base surface, there has been a limit to improving heat radiating characteristics due to constraints on machining the fins.

SUMMARY OF THE INVENTION

The present invention aims to solve the above problems and an object of the present invention is to provide a compact automotive dynamoelectric machine that has superior cooling characteristics by forming ventilating apertures that have a circular cross section on a heatsink instead of thin plate-shaped fins to improve heat radiating performance of the heatsink.

In order to achieve the above object, according to one aspect of the present invention, there is provided an automotive dynamoelectric machine that includes: a rotor that is rotatably disposed inside a case by means of a shaft; a stator that is disposed inside the case so as to surround an outer circumference of the rotor; a heat-generating element that is mounted to an element mount surface of a heatsink and that controls rotation of the rotor electrically; an air intake aperture and an air discharge aperture that are disposed through the case; and a fan that is fixed to an axial end surface of the rotor and that rotates with the rotor so as to generate a cooling airflow that is sucked into the case through the air intake aperture and is discharged outside the case through the air discharge aperture. A large number of ventilating apertures that have a circular cross section are disposed through the heatsink so as to extend from an air intake apertured surface to an air discharge apertured surface so as to have aperture directions that are parallel to each other and parallel to the element mount surface. The heatsink is disposed such that the air intake apertured surface faces the air intake aperture and the aperture directions of the ventilating apertures are aligned in a direction of flow of the cooling airflow.

According to the present invention, because a large number of ventilating apertures that have a circular cross section are disposed through the heatsink so as to have aperture directions that are parallel to each other, heat radiating area and heat transfer rate can be increased compared to thin plate-shaped fins, improving heat radiating performance. Thus, excessive temperature increases can be suppressed in a rectifier and a regulator, enabling stable operation of the dynamoelectric machine to be achieved. In addition, because heat radiating characteristics per unit area are improved, the heatsink can be reduced in size, enabling reductions in the size of the dynamoelectric machine to be achieved.

DETAILED DESCRIPTION OF THE PREFERRED EMBODIMENTS

Preferred embodiments of the present invention will now be explained with reference to the drawings.

Embodiment 1

Figure 1:
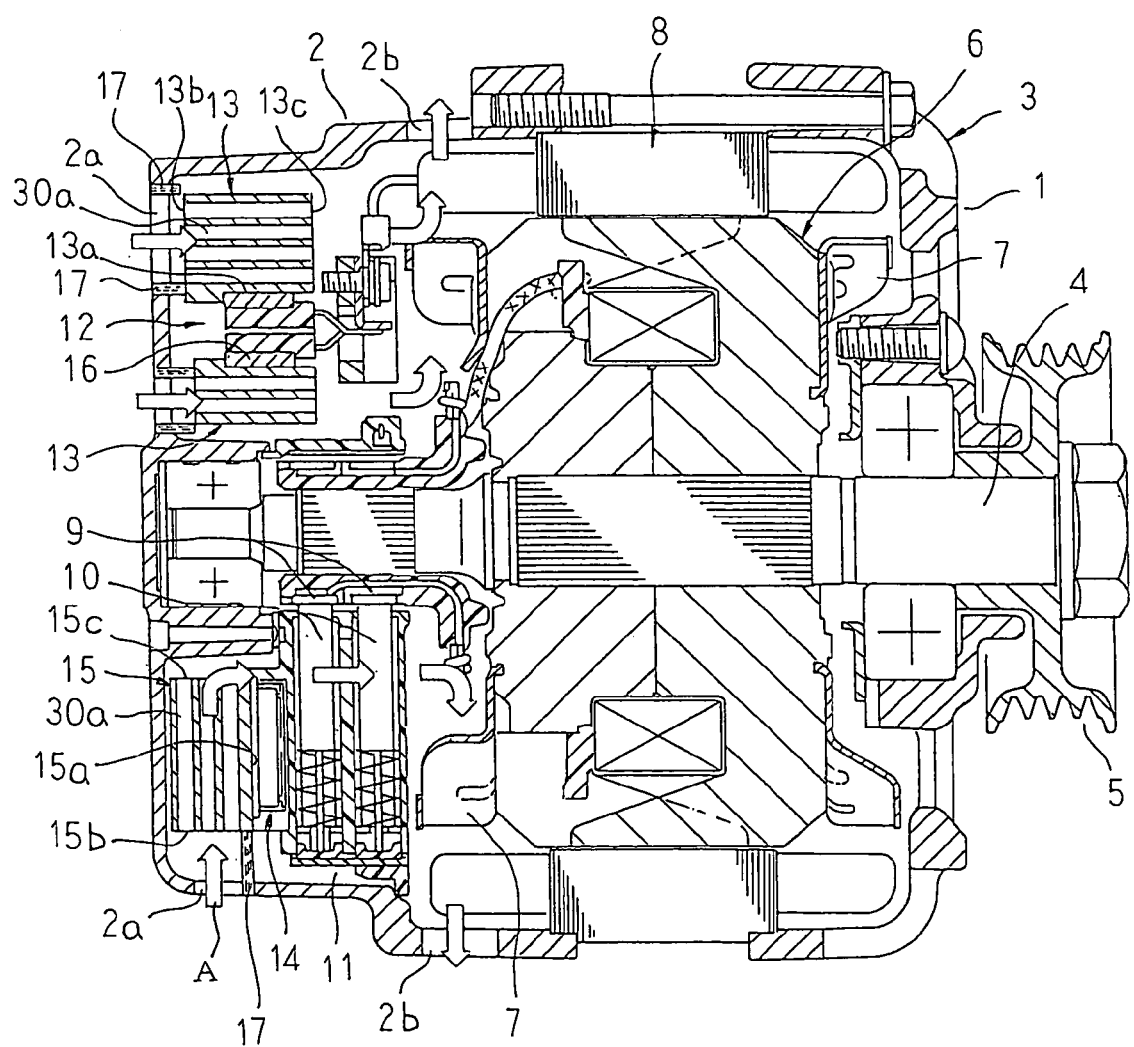
FIG. 1 is a longitudinal section of an automotive alternator according to Embodiment 1 of the present invention.
Figure 2:
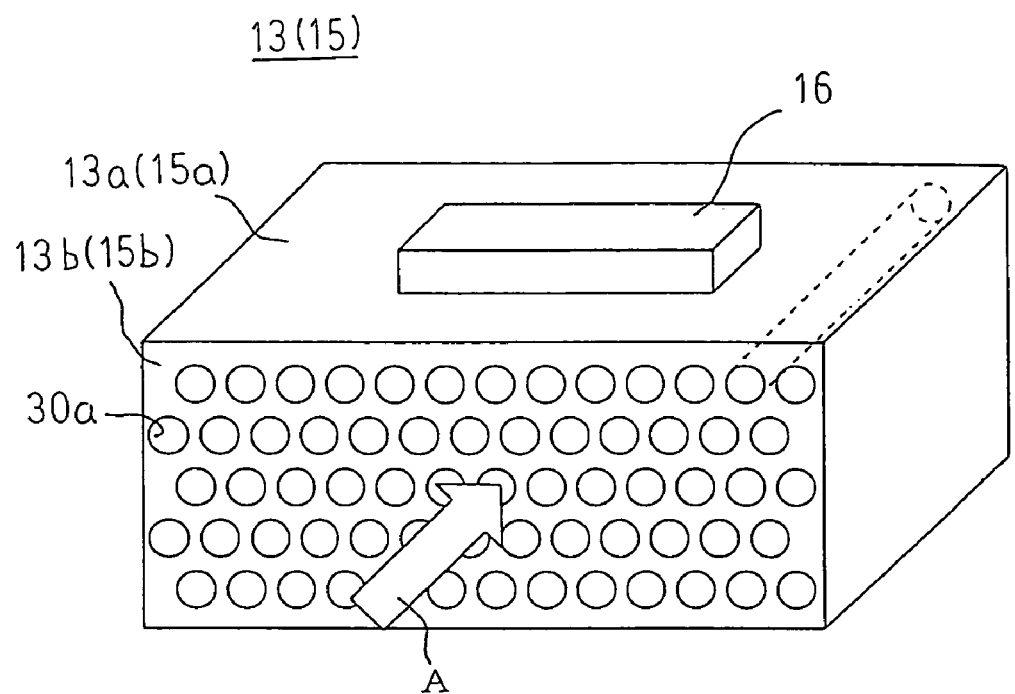
FIG. 2 is a perspective that explains a configuration of a heatsink in the automotive alternator according to Embodiment 1 of the present invention.
Figure 3:
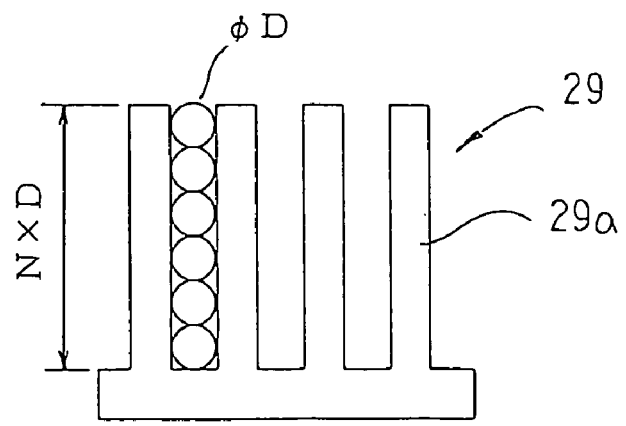
FIG. 3 is a diagram that explains heat radiating characteristics of the heatsink in the automotive alternator according to Embodiment 1 of the present invention.

FIG. 1 is a longitudinal section of an automotive alternator according to Embodiment 1 of the present invention, FIG. 2 is a perspective that explains a configuration of a heatsink in the automotive alternator according to Embodiment 1 of the present invention, and FIG. 3 is a diagram that explains heat radiating characteristics of the heatsink in the automotive alternator according to Embodiment 1 of the present invention. Moreover, in FIG. 1, arrows A represent cooling airflows.

In FIG. 1, an automotive alternator includes: a case 3 that is constituted by a front bracket 1 and a rear bracket 2 that are each approximately bowl-shaped and made of aluminum; a shaft 4 that is rotatably supported by the case 3; a pulley 5 that is fixed to an end portion of the shaft 4 that projects outward at a front end of the case 3; a rotor 6 that is fixed to the shaft 4 and accommodated inside the case 3; fans 7 that are fixed to two axial end surfaces of the rotor 6; a stator 8 that is fixed to an inner wall surface of the case 3 so as to surround an outer circumference of the rotor 6; slip rings 9 that are fixed to a rear end of the shaft 4 so as to supply electric current to the rotor 6; a pair of brushes 10 that are disposed inside the case 3 so as to slide on the slip rings 9; a brush holder 11 that houses the brushes 10; a rectifier 12 that is electrically connected to the stator 8 so as to rectify alternating current generated in the stator 8 into direct current; a heatsink 15 that is mounted to the brush holder 11; and a regulator 14 that is fixed adhesively to the heatsink 14 and adjusts magnitude of alternating voltage generated in the stator 8.

In automotive alternators, the rectifier 12 and the regulator 14 constantly generate heat during power generation. Since operation of the automotive alternator becomes unstable if temperatures of the rectifier 12 and the regulator 14 increase excessively, heatsinks 13 and 15 are mounted to the rectifier 12 and the regulator 14 to maintain the temperatures of the rectifier 12 and the regulator 14 at appropriate values.

A large number of air intake apertures 2a and air discharge apertures 2b are disposed through the rear bracket 2. When the fans 7 are driven to rotate, external air is sucked into the rear bracket 2 through the air intake apertures 2a, and cooling airflows are generated that circulate inside the rear bracket 2 and are then discharged outside the rear bracket 2 through the air discharge apertures 2b. Heat exchange occurs between these cooling airflows and the heatsinks 13 and 15, cooling the rectifier 12 and the regulator 14.

Here, as shown in FIG. 2, the heatsinks 13 (15) are metal members made into rectangular parallelepipeds, for example, using copper, aluminum, etc., and first surfaces thereof constitute element mount surfaces 13a (15a). A large number of circular ventilating apertures 30a are formed so as to have aperture directions that are parallel to the element mount surfaces 13a (15a) and parallel to each other so as to pass through from air intake apertured surfaces 13b (15b) to air discharge apertured surfaces 13c (15c) that face each other on mutually opposite sides of the element mount surfaces 13a (15a) of the heatsinks 13 (15). These ventilating apertures 30a have identical diameters and are arrayed in staggered patterns within cross sections that are perpendicular to the aperture directions.

The heatsinks 13 and 15 that are configured in this manner and are installed inside the case 3 with semiconductor elements 16 that constitute heat-generating elements such as diodes that constitute the rectifier 12, IC chips that constitute the regulator 14, etc., mounted to the element mount surfaces 13a and 15a thereof, such that the air intake apertured surfaces 13b and 15b face the air intake apertures 2a and the aperture directions of the ventilating apertures 30a are approximately aligned with directions of flow of the cooling airflows. The heatsink 13, for example, in which the semiconductor elements 16 that constitute the rectifier 12, i.e., diodes, are mounted to the element mount surface 13a, is installed such that the air intake apertured surfaces 13b face the air intake apertures 2a and the aperture directions of the ventilating apertures 30a are parallel to the central axis of the shaft 4. The heatsink 15, in which the semiconductor elements 16 that constitute the regulator 14, i.e., IC chips, are mounted to the element mount surface 15a, is installed such that the air intake apertured surfaces 15b face the air intake apertures 2a and the aperture directions of the ventilating apertures 30a are perpendicular to the central axis of the shaft 4 and directed toward the central axis of the shaft 4. Cooling airflow introducing walls 17 are disposed so as to extend from inner wall surfaces of the rear bracket 2 to a vicinity of the air intake apertured surfaces 13b and 15b of the heatsinks 13 and 15 such that air that has been sucked in through the air intake apertures 2a of the rear bracket 2 is directed toward the ventilating apertures 30a of the heatsinks 13 and 15.

In an automotive alternator that is constructed in this manner, the rotor 6 is driven to rotate during operation, and the fans 7 are rotated together with the rotation of the rotor 6. Thus, at the rear end, for example, as indicated by arrows A in FIG. 1, external air is sucked in through the air intake apertures 2a that are disposed through the rear bracket 2, is guided by the cooling airflow introducing walls 17 so as to flow to the air intake apertured surfaces 13b and 15b of the heatsinks 13 and 15, and flows inside the ventilating apertures 30a. The cooling airflows (of external air) flow through the ventilating apertures 30a of the heatsinks 13 and 15. Here, the cooling airflows perform heat exchange with inner walls of the ventilating apertures 30a by forced convection heat transfer, and heat from the semiconductor elements 16 is absorbed into the cooling airflows. Then, the air that has flowed through the ventilating apertures 30a flows axially along the shaft 4, is subsequently deflected centrifugally by the fans 7, passes through coil ends of the stator 8 and is discharged through the air discharge apertures 2b.

Next, heat radiating performance of a heatsink 13 that has ventilating apertures 30a will be explained in comparison to a conventional heatsink 29 that has thin plate-shaped fins 29a.

Generally, heat radiating capacity (quantity of heat radiated Q) of a heatsink is expressed by $Q = A \times h \times \Delta T$, where A is heat radiating surface area, $\Delta T$ is a temperature difference between the heatsink and a refrigerant (air, for example), and h is a forced convection heat transfer rate between the heatsink and the refrigerant. In other words, if $\Delta T$ is considered to be fixed, it can be seen that the heat radiating performance of the heatsink can be improved by increasing the heat radiating surface area (A) or the forced convection heat transfer rate (h) between the heatsink and the refrigerant.

First, heat radiating area will be considered.

The heat radiating areas of the heatsink 13 and the conventional heatsink 29 will be compared. As shown in FIG. 3, N circles that have a diameter D are superposed between thin plate-shaped fins 29a that have a clearance D and a height N×D. A total perimeter-area ratio (total perimeter/total area) for the N circles can be calculated by 4/D. On the other hand, the total perimeter-area ratio for the spaces between the thin plate-shaped fins 29a (rectangular shapes) can be calculated by 2×(N+1)/(N×D). Comparing the two, if N>1, the value of the total perimeter-area ratio is greater in the circles. Returning to the heatsink, the total perimeter-area ratio can be said to be an index of the total inside surface area of the ventilating apertures or thin plate-shaped fins divided by the cross-sectional area of the heatsink. In other words, since the total perimeter-area ratio of the circles is greater than that of the thin plate-shaped fins, this means that in heatsinks that have identical cross-sectional area, the heat radiating area can be made larger in a heatsink 13 that has ventilating apertures 30a that have a circular cross section than in a heatsink 29 that has thin plate-shaped fins 29a.

Next, heat transfer rate will be considered.

Generally, heat transfer performance (heat transfer rate) per unit area inside a pipe is increased as pipe diameter decreases. As shown in FIG. 3, when a rectangular groove and ventilating apertures that have a diameter of similar magnitude to the groove are considered, smaller diameter means reduced hydraulic pipe diameter (equivalent diameter). In other words, it can be said that the heat transfer rate of the inner surface of the ventilating apertures 30a is higher.

Thus, if the heatsink 13 that has ventilating apertures 30a and the conventional heatsink 29 that has thin plate-shaped fins 29a are compared at equal volume, it can be said that the heatsink 13 has superior heat radiating performance to the conventional heatsink 29. It can also be said that the heatsink 15 that is configured in a similar manner to the heatsink 13 has superior heat radiating performance to the conventional heatsink 29.

According to Embodiment 1, because a large number of ventilating apertures 30a that have a circular cross section are formed on the heatsinks 13 and 15 so as to have aperture directions that are parallel to the element mount surfaces 13a and 15a and the aperture directions are parallel to each other, the heat radiating performance of the heatsinks 13 and 15 can be increased. Thus, temperatures in the rectifier 12 and the regulator 14 will not increase excessively, enabling an automotive alternator that operates stably to be achieved. In addition, because the heat radiating performance per unit volume in the heatsinks 13 and 15 can be improved, the heatsinks 13 and 15 can be reduced in size, thereby enabling the automotive alternator to be reduced in size.

Because the ventilating apertures 30a are arrayed in staggered patterns within cross sections that is perpendicular to the direction of flow of the cooling airflows, if the diameters of the ventilating apertures 30a are equal, the number of the ventilating apertures 30a that can be formed inside an identical cross-sectional area is increased. Thus, by increasing the number of the ventilating apertures 30a, the inside surface area of the ventilating apertures 30a, i.e., the heat radiating area of the heatsinks 13 and 15, can be increased, enabling the heat radiating performance per unit volume to be improved.

Because the semiconductor elements 16 are mounted to one surface (the element mount surface 13a or 15a) of the heatsink 13 or 15 other than the facing air intake apertured surface 13b or 15b and the air discharge apertured surface 13c or 15c, a plurality of semiconductor elements 16 that constitute a heat-generating body can be disposed in comparatively close proximity. Thus, electrical wiring of the plurality of semiconductor elements 16 can be rationalized, enabling the automotive alternator to be reduced in size.

Now, various kinds of parts are disposed inside the case 3, and from the viewpoint of convenience of layout of these parts, space may also be left vacant in a vicinity of the heatsinks 13 and 15. In a conventional heatsink 29 that has thin plate-shaped fins 29a, cooling airflow that has flowed in between the fins 29a will continue to flow between the fins 29a if no space is left vacant around the heatsink 29. However, if space is left vacant around the heatsink 29, and pressure drop resistance of the flow in that space is less than the pressure drop resistance of the flow between the fins 29a, then the cooling airflow that has flowed in between the fins 29a will flow out from between the fins 29a into the space. Thus, there has been a risk that the cooling airflow rate flowing between the fins 29a may decrease, preventing the heatsink 29 from exhibiting predetermined heat radiating performance.

However, because the cooling airflow introducing walls 17 are disposed so as to extend from inner wall surfaces of the rear bracket 2 to the vicinity of the air intake apertured surfaces 13b and 15b of the heatsinks 13 and 15, the pressure drop resistance of the flow in the clearance between the air intake apertured surfaces 13b and 15b of the cooling airflow introducing walls 17 and the heatsinks 13 and 15 is sufficiently larger than the pressure drop resistance of the flow inside the ventilating apertures 30a. Thus, cooling airflows that have been guided by the cooling airflow introducing walls 17 and have flowed to the air intake apertured surfaces 13b and 15b flow into the ventilating apertures 30a without flowing out through the clearance between the cooling airflow introducing walls 17 and the air intake apertured surfaces 13b and 15b to such spaces. In addition, because the ventilating apertures 30a are isolated from areas surrounding the heatsinks 13 and 15 except at the air intake apertured surfaces 13b or 15b and the air discharge apertured surfaces 13c or 15c, cooling airflows that have flowed into the ventilating apertures 30a from the intake side, flow through the ventilating apertures 30a and flow out from the air discharge apertured surface 13c or 15c without flowing out around the heatsinks 13 and 15 partway along. Thus, because cooling airflows that have been sucked in through the air intake apertures 2a can be used for heat exchange effectively, increasing the heat radiating efficiency compared to conventional heatsinks 29, temperatures in the rectifier 12 and the regulator 14 will not increase excessively, enabling an automotive alternator that operates stably to be achieved.

Embodiment 2

Figure 4:
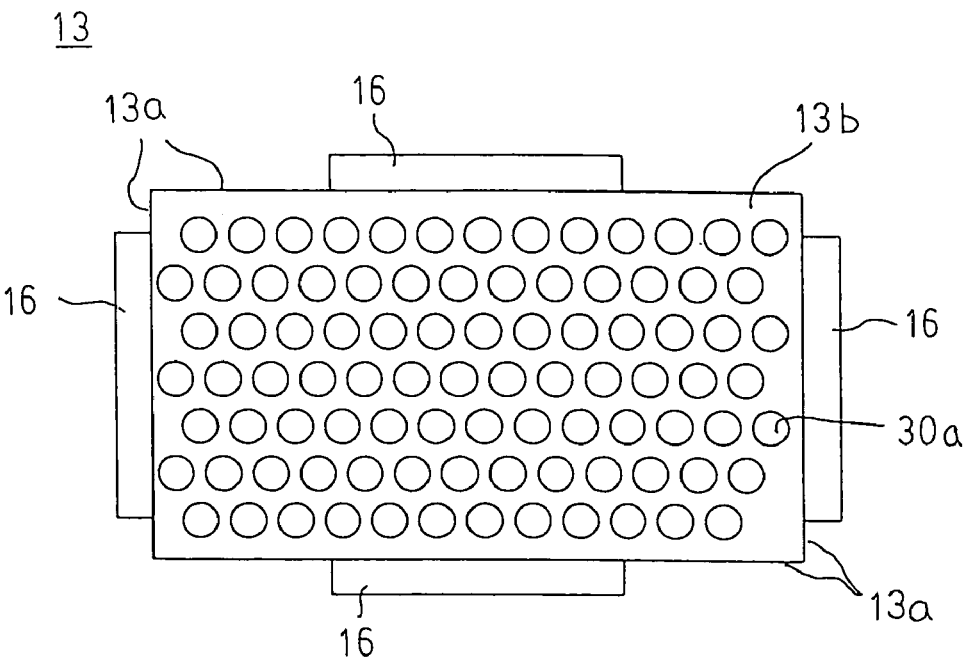
FIG. 4 is an end elevation of a heatsink in an automotive alternator according to Embodiment 2 of the present invention viewed from an apertured surface side.

FIG. 4 is an end elevation of a heatsink in an automotive alternator according to Embodiment 2 of the present invention viewed from an apertured surface side.

In FIG. 4, semiconductor elements 16 are mounted to four surfaces, excluding an air intake apertured surface 13b and an air discharge apertured surface 13c, of a heatsink 13 that is formed into a rectangular parallelepiped.

Moreover, the rest of this embodiment is configured in a similar manner to Embodiment 1 above.

A large number of ventilating apertures 30a are formed so as to have aperture directions that are parallel to the element mount surfaces 13a and parallel to each other so as to pass through from an air intake apertured surface 13b to an air discharge apertured surface 13c that face each other on mutually opposite sides of the element mount surfaces 13a of the heatsink 13. These ventilating apertures 30a are arrayed in a staggered pattern within a cross section that is perpendicular to the aperture directions. Thus, heat flow due to thermal conduction inside a cross section that is perpendicular to the aperture directions of the ventilating apertures 30a (the direction of flow of the cooling airflow) becomes approximately isotropic, enabling the other four surfaces of the heatsink 13 excluding the facing air intake apertured surface 13b and the air discharge apertured surface 13c to be made into element mount surfaces 13a.

Moreover, the other four surfaces, excluding the facing air intake apertured surface 15b and the air discharge apertured surface 15c, of a heatsink 15 that is configured in a similar manner to the heatsink 13, can also be made into element mount surfaces 15a.

In a conventional heatsink 29, on the other hand, because the element mount surface is limited to a base surface, if the number of the semiconductor elements 16 is increased, it is necessary to make the base surface larger, increasing the size of the heatsink 29.

In Embodiment 2, because use is made of the above characteristics of the heatsinks 13 and 15 to mount the semiconductor elements 16 to the other four surfaces of the heatsinks 13 and 15 excluding the facing air intake apertured surface 13b and 15b and the air discharge apertured surfaces 13c and 15c, a large number of the semiconductor elements 16 can be mounted while suppressing increases in the size of the heatsinks 13 and 15. Thus, the volume occupied by the heatsinks 13 and 15 in the limited space inside the case 3 can be kept to a minimum, enabling reductions in the size of the automotive alternator to be achieved.

Moreover, in Embodiment 2 above, the semiconductor elements 16 are mounted to four element mount surfaces, but provided that the semiconductor elements 16 are mounted to two or more element mount surfaces, the heatsink can be reduced in size compared to when they are mounted to one mount surface.

Embodiment 3

Figure 5:
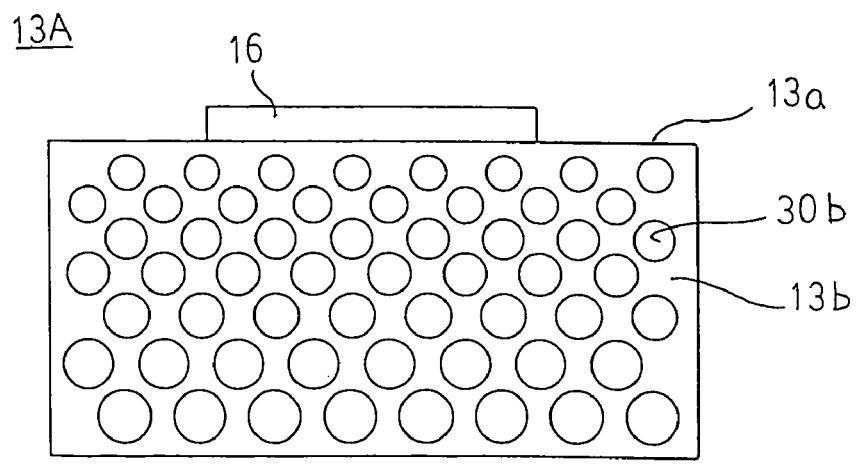
FIG. 5 is an end elevation of a heatsink in an automotive alternator according to Embodiment 3 of the present invention viewed from an apertured surface side.

FIG. 5 is an end elevation of a heatsink in an automotive alternator according to Embodiment 3 of the present invention viewed from an apertured surface side.

In FIG. 5, a large number of ventilating apertures 30b that have a circular cross section are formed in a heatsink 13A so as to have aperture directions that are parallel to an element mount surface 13a and parallel to each other so as to pass through from an air intake apertured surface 13b to an air discharge apertured surface that face each other on mutually opposite sides of the element mount surface 13a. These ventilating apertures 30b are formed so as to have diameters that increase as distance from the element mount surface 13a increases. In addition, distances between adjacent ventilating apertures 30b are adjusted such that the percentage of area occupied by the ventilating apertures 30b in a cross section that is perpendicular to the aperture directions, i.e., the porosity, is constant over the entire surface regardless of whether the diameters of the ventilating apertures 30b are large or small.

Moreover, the rest of this embodiment is configured in a similar manner to Embodiment 1 above.

Now, in a heatsink 13 in which ventilating apertures 30a that have identical diameters are formed uniformly, heat that is generated by the semiconductor elements 16 is removed by convective heat transfer with the air flowing through the ventilating apertures 30a as the heat propagates through the heatsink 13 by thermal conduction. At this time, because distances that the heat propagates due to thermal conduction are longer in portions of the heatsink 13 that are far from the semiconductor elements 16 than in portions that are nearby, temperatures are easily reduced. Thus, since temperature differences with the air flowing through the ventilating apertures 30a are reduced in the portions in question, the quantity of heat that is removed by convective heat transfer decreases, reducing the heat radiating performance of the portions in question.

In Embodiment 3, because the diameters of the ventilating apertures 30b are increased as the distance increases from the element mount surface 13a while keeping the porosity over the entire surface of the cross section that is perpendicular to the aperture directions constant, the heat radiating performance of portions that are far from the element mount surface 13a, whose contribution to overall heat radiating capacity is small, is reduced, but pressure loss is also reduced. Since the pressure loss decreases, the quantity of cooling airflow that passes through the heatsink 13A increases. Thus, the heat radiating capacity of the portions that are in close proximity to the element mount surface 13a, whose contribution to the heat radiating performance is large, is improved, enabling the heat radiating capacity of the heatsink 13A as a whole to be improved.

Consequently, by using the heatsink 13A, temperatures in the rectifier 12 and the regulator 14 will not increase excessively, enabling an automotive alternator that operates more stably to be achieved.

Moreover, in Embodiment 3 above, the ventilating apertures 30b are formed such that the diameter of the ventilating apertures 30b increase as distance from the element mount surface 13a increases, but the ventilating apertures 30a may also be formed such that the diameters of the ventilating apertures 30a are made equal and distances between adjacent ventilating apertures 30a become shorter as distance from the element mount surface 13a increases.

Embodiment 4

Figure 6:
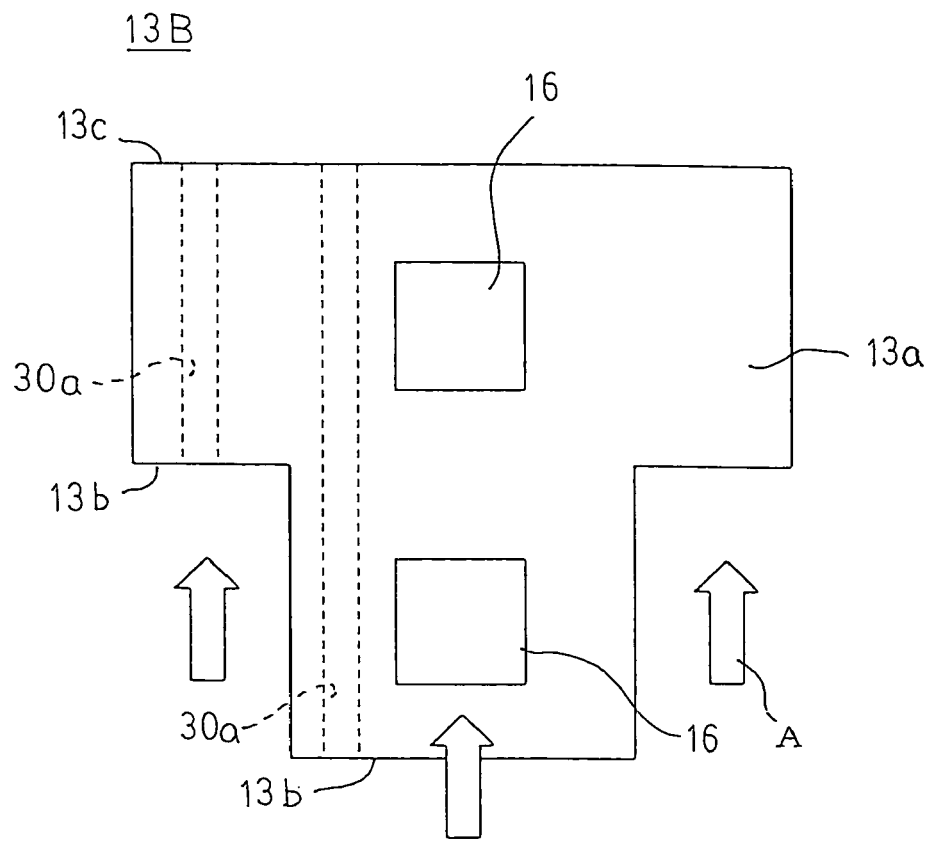
FIG. 6 is a top plan of a heatsink in an automotive alternator according to Embodiment 4 of the present invention viewed from an element mount surface side.
Figure 7:
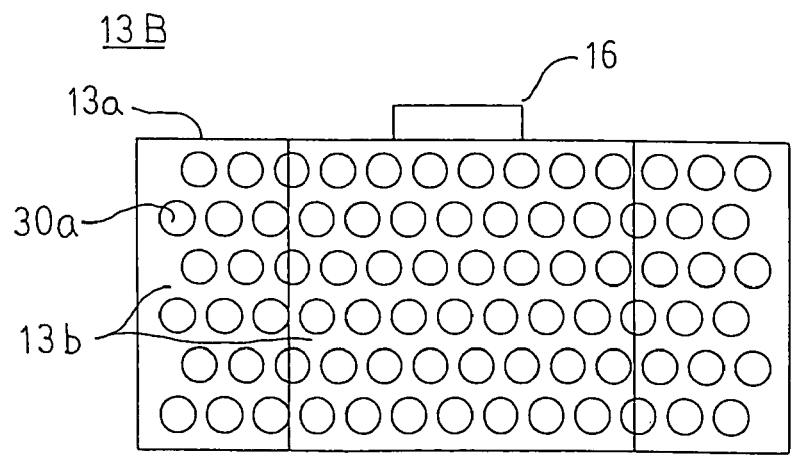
FIG. 7 is an end elevation of the heatsink in the automotive alternator according to Embodiment 4 of the present invention viewed from an apertured surface side.

FIG. 6 is a top plan of a heatsink in an automotive alternator according to Embodiment 4 of the present invention viewed from an element mount surface side, and FIG. 7 is an end elevation of the heatsink in the automotive alternator according to Embodiment 4 of the present invention viewed from an apertured surface side.

In FIGS. 6 and 7, a large number of ventilating apertures 30a are formed in a heatsink 13B so as to have aperture directions that are parallel to an element mount surface 13a and parallel to each other so as to pass through from an air intake apertured surface 13b to an air discharge apertured surface 13c that face each other on mutually opposite sides of the element mount surface 13a. These ventilating apertures 30a have identical diameters and are arrayed in a staggered pattern within a cross section that is perpendicular to the aperture directions. In addition, the heatsink 13B is formed such that a cross-sectional area perpendicular to the aperture directions is greater in a portion downstream from center in a direction of flow A of a cooling airflow than in a portion upstream from center in the direction of flow of the cooling airflow.

Moreover, the rest of this embodiment is configured in a similar manner to Embodiment 1 above.

Now, in a heatsink 13 in which ventilating apertures 30a that have identical diameters are formed uniformly, if the semiconductor elements 16 are mounted onto the element mount surface 13a so as to line up in single columns in the direction of flow A of the cooling airflow, the cooling airflow that flows through the ventilating apertures 30a exchanges heat with the heatsink 13 upstream in the direction of flow of the cooling airflow, rises in temperature, and flows downstream. In other words, the temperature of the cooling airflow that flows through the ventilating apertures 30a becomes progressively greater downstream. Thus, since the heatsink 13 must exchange heat with cooling airflow that has a high temperature at the downstream end, the temperature of the semiconductor elements 16 at the downstream end is greater than that of the semiconductor elements 16 at the upstream end. Because of this, there is a risk that biases may arise between the temperatures of the semiconductor elements 16 at the upstream end and the downstream end.

In Embodiment 4, because the cross-sectional area perpendicular to the aperture directions is greater in the portion downstream from center in the direction of flow of a cooling airflow than in the portion upstream from center in the direction of flow of the cooling airflow, the passage cross-sectional area of the cooling airflow in the heatsink 13B is greater at the downstream end than at the upstream end.

Reducing the cross-sectional area (the total ventilating aperture inside surface area) at the upstream end and increasing the cross-sectional area (the total ventilating aperture inside surface area) at the downstream end decreases pressure loss in the flow at the upstream end, and increases the quantity of cooling airflow that passes through the heatsink 13B. Cooling performance is improved at the downstream end by an amount proportionate to the increase in the quantity of cooling airflow and the total ventilating aperture inside surface area. Thus, biases no longer arise between the temperatures of the semiconductor elements 16 at the upstream end and the downstream end. Semiconductor elements 16 that are arrayed in columns in the direction of flow of the cooling airflow can thereby be cooled within a limited heatsink volume such that their temperatures are uniform.

Embodiment 5

Figure 8:
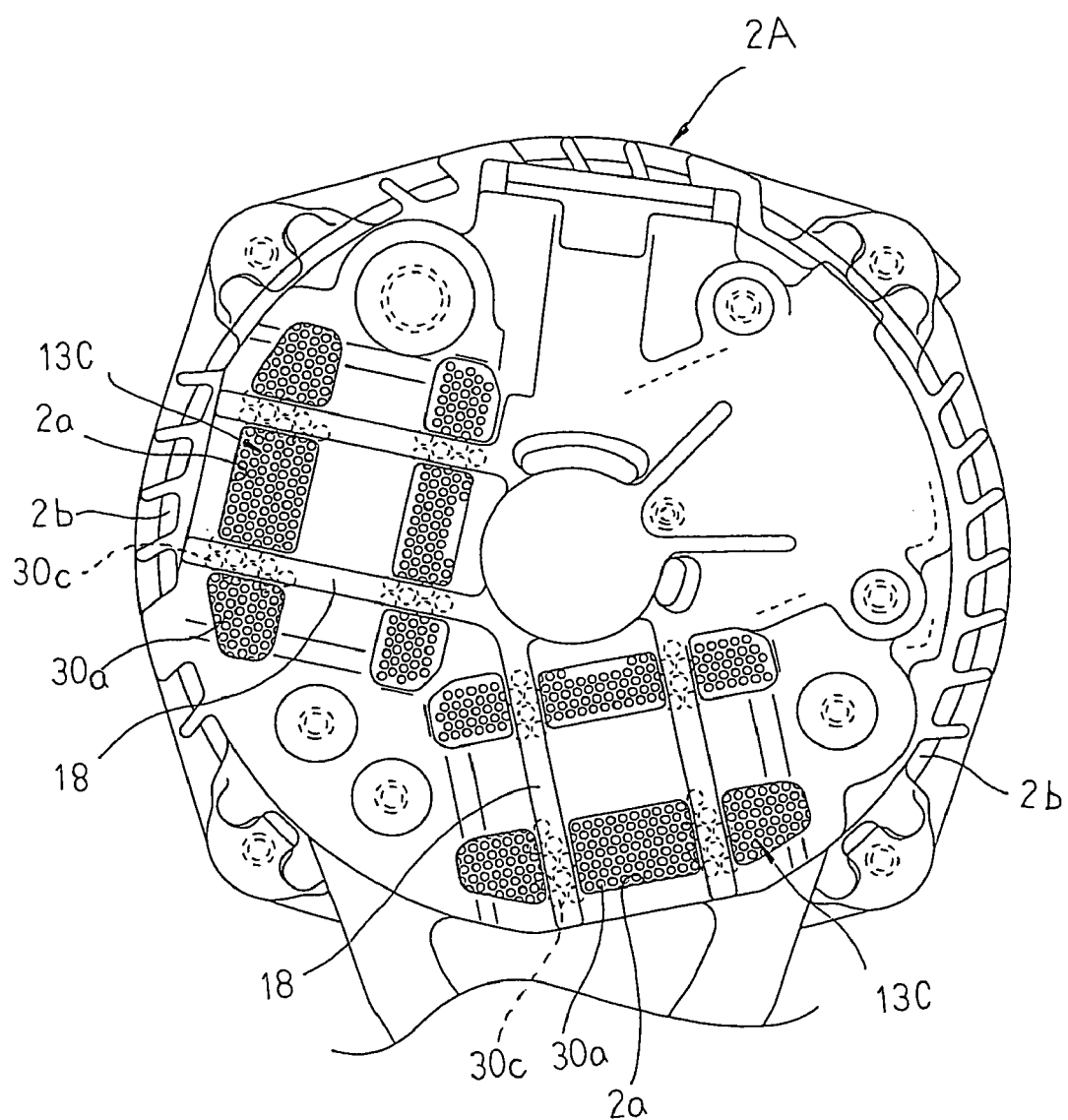
FIG. 8 is an end elevation of an automotive alternator according to Embodiment 5 of the present invention viewed from a rear end.

FIG. 8 is an end elevation of an automotive alternator according to Embodiment 5 of the present invention viewed from a rear end.

In FIG. 8, air intake apertures 2a are disposed in the rear bracket 2A so as to face air intake apertured surfaces 13b of heatsinks 13C, and ribs 18 are disposed on the rear bracket 2A so as to lie across the air intake apertures 2a and face the air intake apertured surfaces 13b. In a similar manner to the heatsink 13, the heatsinks 13C are metal members made into rectangular parallelepipeds, for example, using copper, aluminum, etc., and first surfaces thereof constitute element mount surfaces 13a. A large number of ventilating apertures 30a and 30c that have a circular cross section are formed so as to have aperture directions that are parallel to the element mount surfaces 13a and parallel to each other so as to pass through from air intake apertured surfaces 13b to air discharge apertured surfaces that face each other on mutually opposite sides of the element mount surfaces 13a of the heatsinks 13C. These ventilating apertures 30a and 30c are arrayed in staggered patterns within cross sections that are perpendicular to the aperture directions. Ventilating apertures 30c in regions that face the ribs 18 are formed so as to have larger diameters than the ventilating apertures 30a in other regions.

Moreover, the rest of this embodiment is configured in a similar manner to Embodiment 1 above.

According to Embodiment 5, because the ribs 18 are disposed on the rear bracket 2A so as to lie across the air intake apertures 2a, mechanical strength of the rear bracket 2A in a vicinity of the air intake apertures 2a is increased, enabling a highly reliable automotive alternator to be provided.

Now, in a heatsink 13 in which ventilating apertures 30a that have identical diameters are formed uniformly, if ribs 18 are disposed opposite the air intake apertured surfaces 13b, the ribs 18 give rise to pressure loss of the cooling airflow at the ventilating apertures 30a in portions that overlap with the ribs 18, making it less likely that cooling airflow will flow in compared to the ventilating apertures 30a in portions that do not overlap with the ribs 18. Because of this, heat radiating performance of the portions of the heatsinks 13 and 15 that overlap with the ribs 18 is poorer than in other portions, and there is a risk that it may not be possible to cool the rectifier 12 and the regulator 14 uniformly.

In Embodiment 5, because the diameters of the ventilating apertures 30c in regions that face the ribs 18 are larger than the diameters of the ventilating apertures 30a in other regions, pressure loss of the flow is reduced compared to the other regions, making it easier for the cooling airflow to flow into the ventilating apertures 30c. Thus, biases in the quantity of cooling airflow that passes through the ventilating apertures 30a and 30c that result from disposing the ribs 18 are eliminated, enabling the heat radiating performance of the heatsink 13C to be made uniform.

Embodiment 6

Figure 9:
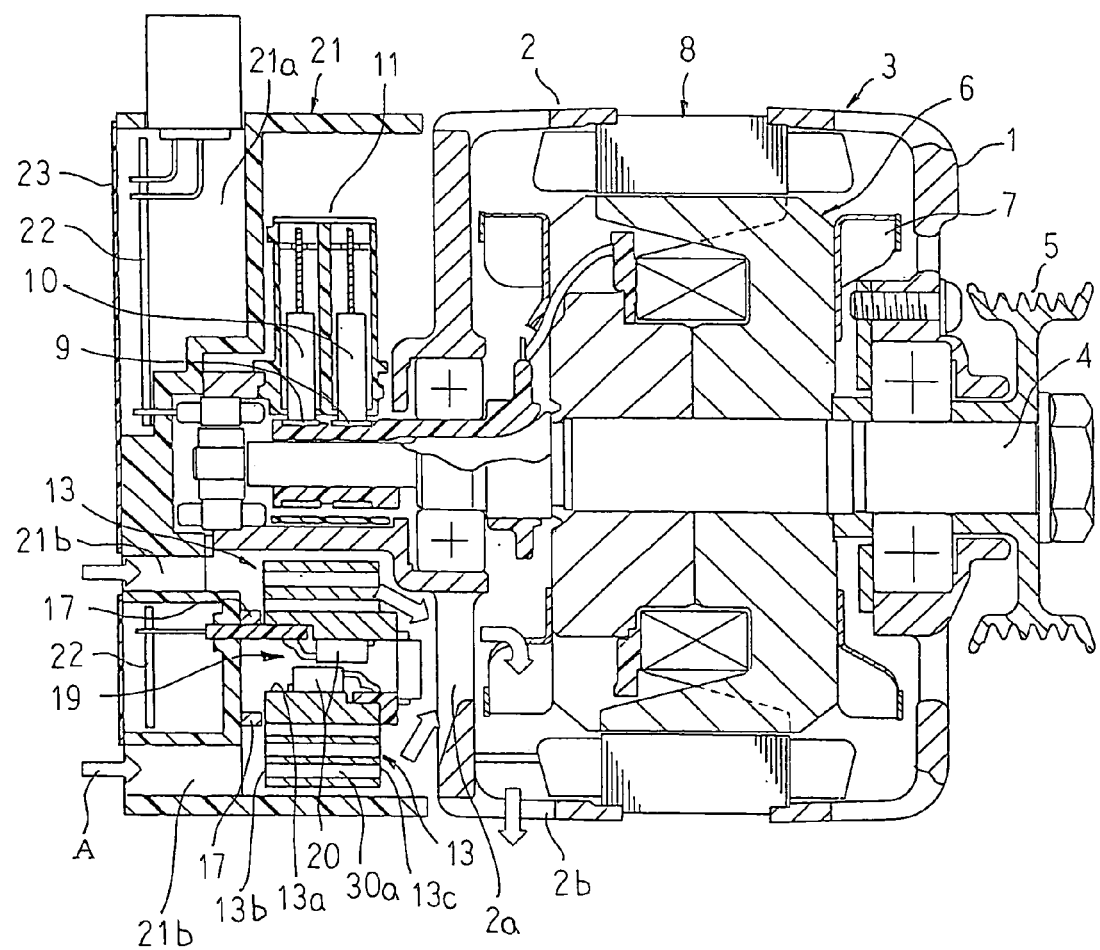
FIG. 9 is a longitudinal section of an automotive alternating-current motor-generator according to Embodiment 6 of the present invention.
Figure 10:
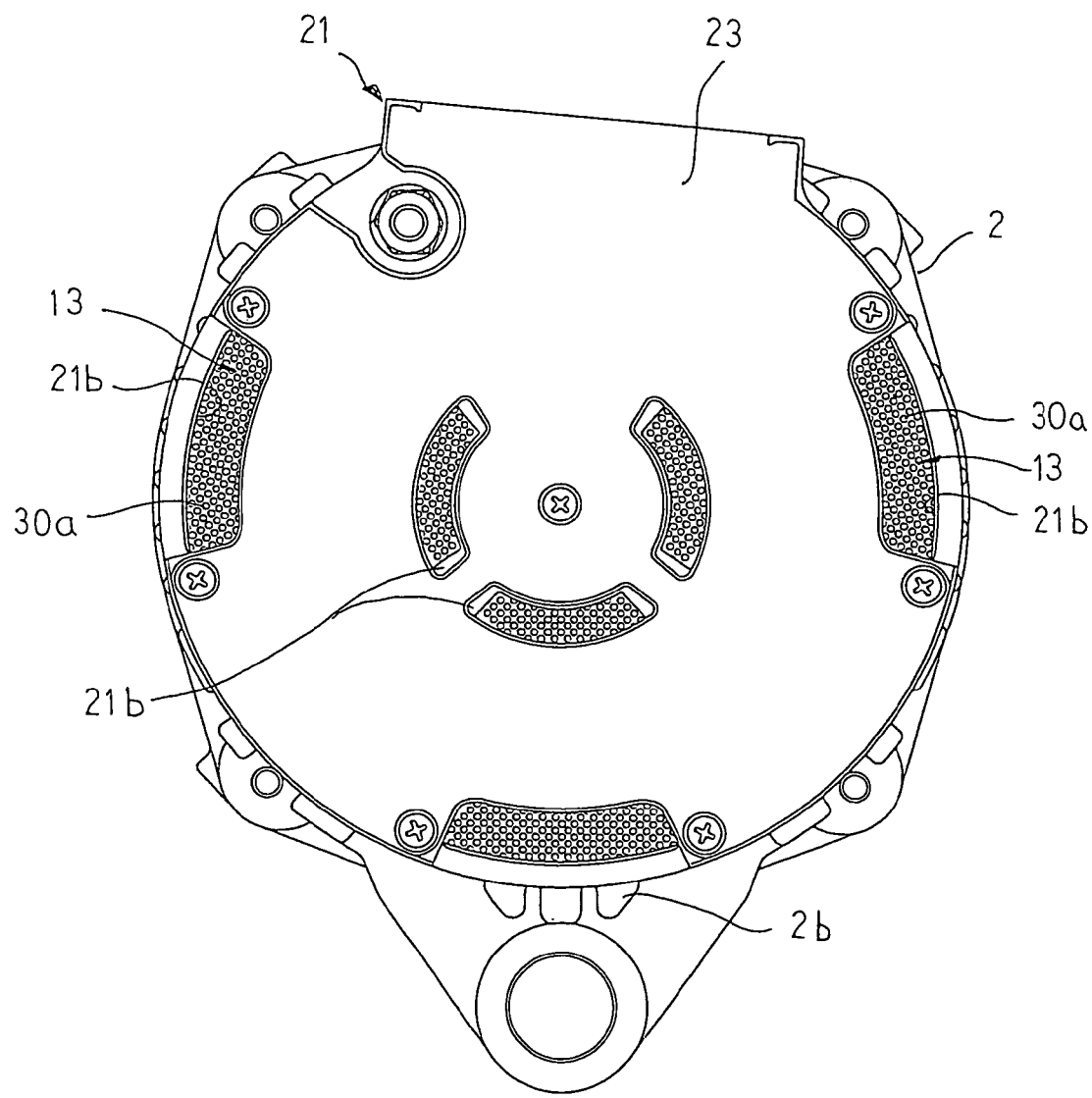
FIG. 10 is an end elevation of the automotive alternating-current motor-generator according to Embodiment 6 of the present invention viewed from a rear end.

FIG. 9 is a longitudinal section of an automotive alternating-current motor-generator according to Embodiment 6 of the present invention, and FIG. 10 is an end elevation of the automotive alternating-current motor-generator according to Embodiment 6 of the present invention viewed from a rear end.

In FIGS. 9 and 10, an automotive alternating-current motor-generator includes: a front bracket 1 and a rear bracket 2 that are each approximately bowl-shaped and made of aluminum; a shaft 4 that is rotatably supported by the front bracket 1 and the rear bracket 2; a pulley 5 that is fixed to an end portion of the shaft 4 that projects outward at a front end of the front bracket 1; a rotor 6 that is fixed to the shaft 4 and accommodated inside the front bracket 1 and the rear bracket 2; fans 7 that are fixed to first and second axial end surfaces of the rotor 6; and a stator 8 that is fixed to an inner wall surface of the front bracket 1 and the rear bracket 2 so as to surround the rotor 6. Slip rings 9 are fixed to an end portion of the shaft 4 that projects outward at a rear end of the rear bracket 2, and a pair of brushes 10 are housed in a brush holder 11 and disposed outside an axial rear end of the rear bracket 2 so as to slide on the slip rings 9.

A power element unit 19 is also disposed outside the axial rear end of the rear bracket 2. The power element unit 19 includes a plurality of switching elements 20 that constitute a power generating element. The plurality of switching elements 20 are mounted onto element mount surfaces 13a of heatsinks 13. A bowl-shaped insert case 21 is mounted to the rear bracket 2 from outside the rear end so as to cover the brush holder 11 and the power element unit 19. A control circuit board 22 that incorporates a control circuit is housed inside a control circuit board housing portion 21a of the insert case 21, and a cover 23 is also mounted to the insert case 21 so as to cover the control circuit board housing portion 21a.

Case air intake apertures 21b are disposed through the insert case 21 so as to face air intake apertured surfaces 13b of the heatsinks 13, and cooling airflow introducing walls 17 are disposed so as to extend from inner wall surfaces of the insert case 21 to a vicinity of the air intake apertured surfaces 13b of the heatsinks 13.

Moreover, the front bracket 1 and the insert case 21 correspond to a case.

In an automotive alternating-current motor-generator that is configured in this manner, when starting a vehicle engine, the switching elements 20 are on-off controlled such that alternating current is supplied to a stator winding of the stator 8 and a field current is supplied to a field coil of the rotor 6. The rotor 6 is thereby driven to rotate, and torque from the shaft 4 is transmitted to an output shaft of the engine by means of the pulley 5 and a belt (not shown) to start the engine.

Once the engine has been started, torque from the engine is transmitted to the shaft 4 by means of the belt and the pulley 5, rotating the shaft 4. Thus, when a field current is supplied to the field coil by means of the brushes 10 and the slip rings 9, the field coil is excited and becomes an electromagnet. By rotating the rotor 6 inside of the stator 8 in this state, alternating currents are sequentially induced in the stator winding. The switching elements 20 are on-off controlled such that three-phase alternating current is rectified into direct current, and a battery is charged.

Heat is generated when these switching elements 20 are on-off controlled. It is necessary to remove the heat that is generated by the switching elements 20 for this automotive alternating-current motor-generator to operate normally.

During operation of the automotive alternating-current motor-generator, the rotor 6 is driven to rotate, and the fans 7 are rotated together with the rotation of the rotor 6. Thus, at the rear end, for example, as indicated by arrows A in FIG. 9, external air is sucked in through the case air intake apertures 21b, is guided by the cooling airflow introducing walls 17 so as to flow to the air intake apertured surfaces 13b of the heatsinks 13, and flows inside ventilating apertures 30a. The cooling airflows (of external air) flow through the ventilating apertures 30a of the heatsinks 13. Here, the cooling airflows perform heat exchange with inner walls of the ventilating apertures 30a by forced convection heat transfer, and heat from the switching elements 20 is absorbed into the cooling airflows. Then, the cooling airflows that have flowed through the ventilating apertures 30a flow through the air intake apertures 2a into the rear bracket 2, are then deflected centrifugally by the fans 7, pass through coil ends of the stator 8 and are discharged through the air discharge apertures 2b.

In Embodiment 6, because a large number of ventilating apertures 30a are formed on the heatsinks 13 with aperture directions parallel to the element mount surfaces 13a and with the aperture directions parallel to each other in a similar manner to Embodiment 1 above, the heat radiating performance of the heatsinks 13 can be increased compared to conventional heatsinks 29 that have thin plate-shaped fins 29a. Thus, because heat from the switching elements 20 is removed using this heatsink 13, an integrated control apparatus automotive alternating-current motor-generator that has superior heat radiating characteristics can be achieved.

In Embodiment 6, because the heat radiating performance per unit volume in the heatsinks 13 can also be improved, the heatsinks 13 can be reduced in size, thereby enabling the automotive alternating-current motor-generator to be reduced in size.

Because the ventilating apertures 30a are arrayed in staggered patterns within cross sections that are perpendicular to the direction of flow of the cooling airflows, the heat radiating performance per unit volume can be improved in a similar manner to Embodiment 1 above.

Because the cooling airflow introducing walls 17 are disposed so as to extend from inner wall surfaces of the insert case 21 to a vicinity of the air intake apertured surfaces 13b of the heatsinks 13, cooling airflows that have been sucked in through the case air intake apertures 21b are used for heat exchange effectively and temperatures in the switching elements 20 will not increase excessively, enabling an automotive alternating-current motor-generator that operates stably to be achieved.

Moreover, in each of the above embodiments, the present invention is explained as it applies to automotive alternators and automotive electric motor-generators as automotive dynamoelectric machines, but similar effects are also exhibited if the present invention is applied to other dynamoelectric machines such as automotive alternating-current motors, etc.

What is claimed is:

1. An automotive dynamoelectric machine comprising:
   a rotor that is rotatably disposed inside a case by means of a shaft;
   a stator that is disposed inside said case so as to surround an outer circumference of said rotor;
   a heat-generating element that is mounted to an element mount surface of a heatsink and that controls rotation of said rotor electrically;
   an air intake aperture and an air discharge aperture that are disposed through said case; and
   a fan that is fixed to an axial end surface of said rotor and that rotates with said rotor so as to generate a cooling airflow that is sucked into said case through said air intake aperture and is discharged outside said case through said air discharge aperture,
   wherein:
   a large number of ventilating apertures that have a circular cross section are disposed through said heatsink so as to extend from an air intake apertured surface to an air discharge apertured surface so as to have aperture directions that are parallel to each other and parallel to said element mount surface; and
   said heatsink is disposed such that said air intake apertured surface faces said air intake aperture and said aperture directions of said ventilating apertures are aligned in a direction of flow of said cooling airflow.

2. An automotive dynamoelectric machine according to claim 1, wherein a cooling airflow introducing wall is disposed so as to guide said cooling airflow that has been sucked in through said air intake aperture toward said air intake apertured surface.

3. An automotive dynamoelectric machine according to claim 1, wherein:
   a rib is disposed on said case so as to lie across said air intake aperture and face said air intake apertured surface; and
   ventilating apertures that face said rib are formed so as to have a diameter that is greater than a diameter of ventilating apertures that face said air intake aperture.

4. An automotive dynamoelectric machine according to claim 1, wherein:
   said heat-generating element is mounted to a single element mount surface other than said air intake apertured surface and said air discharge apertured surface of said heatsink; and
   said ventilating apertures are formed so as to be arrayed in a staggered pattern in a cross section of said heatsink that is perpendicular to said aperture directions.

5. An automotive dynamoelectric machine according to claim 1, wherein said heat-generating element is mounted to at least two element mount surfaces other than said air intake apertured surface and said air discharge apertured surface of said heatsink.

6. An automotive dynamoelectric machine according to claim 1, wherein:

said heat-generating element is mounted to a single element mount surface other than said air intake apertured surface and said air discharge apertured surface of said heatsink; and said ventilating apertures are formed so as to have diameters that increase as distance increases in a direction that is perpendicular to said element mount surface.

7. An automotive dynamoelectric machine according to claim 1, wherein:

said heat-generating element is mounted to a single element mount surface other than said air intake apertured surface and said air discharge apertured surface of said heatsink; and said ventilating apertures are formed such that spacing between adjacent ventilating apertures becomes narrower as distance increases in a direction that is perpendicular to said element mount surface.

8. An automotive dynamoelectric machine according to claim 1, wherein said heatsink is formed such that a cross-sectional area that is perpendicular to said aperture direction is greater downstream in said direction of flow of said cooling airflow than upstream.

* * * * *